T. MIDGLEY, Jr.
HYDROMETER.
APPLICATION FILED JULY 30, 1917.

1,432,773.

Patented Oct. 24, 1922.

Witnesses
Walter W. Riedel
Louis A. Slife

Inventor
Thomas Midgley Jr.
By Kerr, Page, Cooper & Hayward
Attorneys

Patented Oct. 24, 1922.

1,432,773

UNITED STATES PATENT OFFICE.

THOMAS MIDGLEY, JR., OF DAYTON, OHIO, ASSIGNOR, BY MESNE ASSIGNMENTS, TO DELCO-LIGHT COMPANY, OF DAYTON, OHIO, A CORPORATION OF DELAWARE.

HYDROMETER.

Application filed July 30, 1917. Serial No. 183,486.

*To all whom it may concern:*

Be it known that I, THOMAS MIDGLEY, Jr., a citizen of the United States of America, residing at city of Dayton, in the county of Montgomery and State of Ohio, have invented certain new and useful Improvements in Hydrometers, of which the following is a full, clear, and exact description.

The present invention relates to improvements in hydrometers and particularly to that class of hydrometers used in connection with secondary batteries for the purpose of indicating the degree of charge thereof.

One of the objects of the present invention is to provide a hydrometer which may be permanently submerged within the battery electrolyte, and which will operate efficiently in submerged position.

A further object of the present invention is to provide a hydrometer adapted to be permanently submerged within the electrolyte of the battery, and having provisions for compensating for the variations in temperature of the battery electrolyte.

A further object of the present invention is to provide a hydrometer including a carrying or scale member of such material as to be free from adhesion of gas generated within the battery.

Another feature of the present invention is the method of determining the proper location of the hydrometer within the battery electrolyte, so that it will be least affected in its operation by the stratification of the battery electrolyte.

While the above are a few of the objects of the present invention, other objects and advantages will be apparent from the foregoing description, reference being had to the accompanying drawing, wherein one preferred embodiment of the present invention is clearly illustrated.

In the drawing:

Fig. 1 is a view in side elevation of a battery cell wherein a hydrometer, including the present invention, is mounted.

Figs. 2 and 2ª are detailed views of the stationary indicating element which also provides a mounting for the hydrometer.

Figure 1:
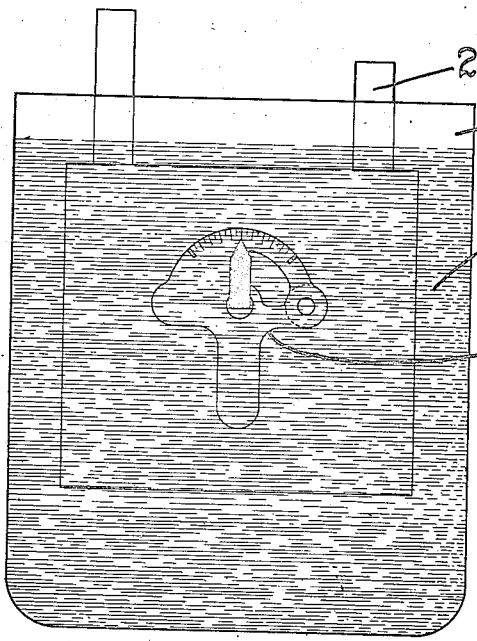
Figures 2, 2A:
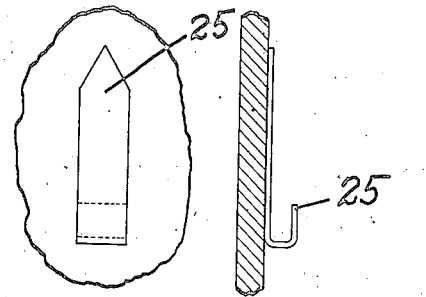
Figure 4:
Fig. 4 is a sectional view taken on the line 4—4 of Fig. 3.
Figure 5:
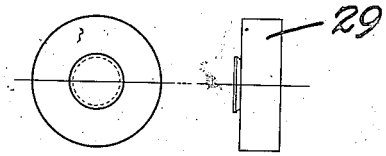
Fig. 5 is a detailed view of the displacement member or weight element of the hydrometer.

Referring to the drawing, and more particularly to Fig. 1, the numeral 20 indicates a glass-jar battery cell, 21 represents the electrolyte therein, and 22 the plate assembly of the battery. The hydrometer member indicated by the numeral 23 is mounted within the battery jar and is shown in Fig. 1 in the midposition of its range of movement indicating that this cell of the battery is half-discharged. This hydrometer member comprises a body portion or scale member 24 which is pivotally mounted upon the supporting element or stationary indicating element 25.

In the present form of the invention the supporting element 25 is shown as being secured to one of the walls of the battery jar, but it will be readily seen that this element may be supported by attaching the same to the battery plate which is adjacent to the end wall of the battery jar. This supporting element is preferably celluloid, although certain other materials may be used.

Figure 3:
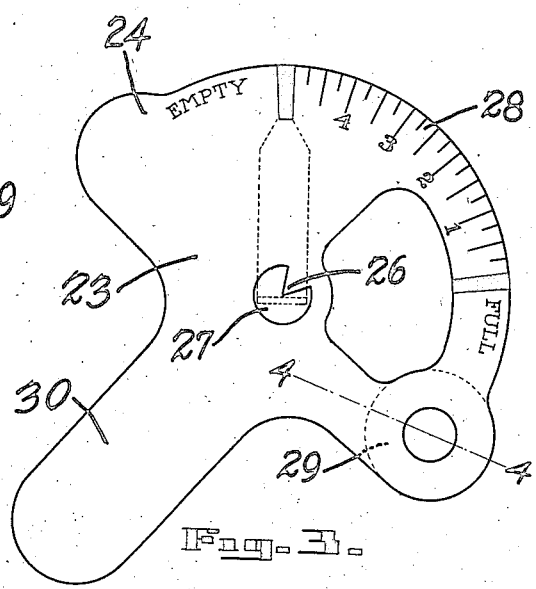
Fig. 3 is a view in side elevation of the hydrometer member removed from the battery cell, the stationary indicating element, shown in Figs. 2 and 2ª, being shown in this view in dotted lines.

As stated above, the scale member 24 is pivotally mounted on the supporting element 25 by means of the point contact 26, which is formed by cutting away a portion of the scale member, adjacent the center thereof as at 27 (see Fig. 3). This construction in reality furnishes a knife-edge bearing for the scale member 24 on the supporting element 25.

It has been found in practice that beneath the surface of the electrolyte this mounting is practically frictionless and is preferable to other constructions which create greater friction in the operation of the hydrometer.

The scale member 24 carries a scale 28, the position of which with respect to the stationary indicating element 25, indicates the degree of charge within the battery.

Any approved scale may be used, reading either in specific gravity, Baumé, per cent charge, or an arbitrary scale to correspond to some other piece of apparatus. If desirable, a plurality of scales may be marked or carried by the scale member 24, but in the present instance only a single scale is shown.

Several different materials may be employed in constructing the scale member 24, but this scale member should be of greater specific gravity than the heaviest specific gravity which will be encountered in the electrolyte of the cell during operation.

One preferred material for constructing this scale member is celluloid, and I have discovered a method of preparing the same which overcomes the objections heretofore prohibiting its use as a hydrometer material.

The main objection to the use of celluloid in hydrometers, has been that bubbles of gas tend to cling to the surface of the celluloid, and thereby cause errors in the indicating operation of the hydrometer.

My new process of preparing celluloid for use in hydrometer work, consists in scouring or washing the celluloid with any suitable mixture which will render the celluloid chemically clean. One form of mixture may include powdered pumice stone and sodium cyanide. The celluloid is first scoured with this solution and then rinsed in distilled water, and then should be kept free from dust or any foreign matter until placed in use.

Upon the first operation of the battery in which gassing occurs for a considerable period, the action of the electrolyte tends to complete the preparation of the celluloid, after which no further gas bubbles will adhere to the celluloid.

A rubber displacement member or weight element 29 is combined with the scale member 24, and is constructed by substantially the same process or method as that disclosed in my co-pending Patent, No. 1,335,253, dated March 30, 1920.

However, it should be understood that certain additional features are present in the method of preparing and using this displacement member in the present invention, over the method disclosed in the above-mentioned patent. For instance, in the present process of preparing the displacement member, the degree or amount of vulcanization of the displacement member is carefully determined, so that the proper degree of expansion and contraction, due to the variations in temperature of the battery electrolyte, may be secured.

The method of operation of the present form of my invention may be described as follows, reference being had to Fig. 1 of the drawing: The hydrometer, when in the central position disclosed in Fig. 1, indicates that the battery cell is charged to one-half of its capacity. The specific gravity of the electrolyte when the hydrometer assumes this position, is desirably the same as the specific gravity of the rubber displacement member, as has been stated. That is, this displacement member has a determined specific gravity, and this specific gravity—other circumstances being taken into consideration, is substantially the same as the specific gravity of the electrolyte when the hydrometer is in the balanced position shown in Fig. 1.

However, if the battery cell is further discharged below its half-charged point, the specific gravity of the electrolyte will diminish or become lighter, and therefore the displacement member 29 will of course tend to sink to the bottom of the cell. This displacement member, however, being rigidly connected to or carried by the scale member 24 must necessarily carry the scale member with it, and therefore a clockwise movement of the scale member will result. This clockwise movement of the scale member will be about the center of the knife-edge contact on the support 25 and will be practically frictionless, due to the type of support, described heretofore.

In order to secure a proper and correct reading of the scale member to indicate the degree or percentage of charge of the battery cell, the scale member is provided with a projecting finger or counterweight portion 30, which, as the scale member tends to move in a clockwise direction, due to the influence of the displacement member 29, will tend to oppose this clockwise movement and tend to return the scale member to its balanced position, shown in Fig. 1.

It will of course be understood that as the displacement member tends to carry the scale member further in a clockwise direction, the force of this counter-weight portion 30 will also increase, and I have so proportioned this counterweight portion 30 with relation to the displacement member 29 that a state of balance will be reached between these forces, when the clockwise displacement of the scale member from its central position has moved to such a position as to properly indicate the degree of discharge of the battery cell.

It will be apparent that if the battery cell is charged above the half-charged point, conditions exactly opposite to those described above will come into play, rendering the hydrometer operative in the same way, but in an opposite direction to correctly indicate the degree of charge.

It has been found in practice that a movement of the hydrometer of 45 degrees each way from the central position, causes most satisfactory results, but this movement may be increased to 60 degrees each way without seriously effecting the efficiency of the device.

While the form of mechanism herein shown and described, constitutes a preferred form of embodiment of the invention, it is to be understood that other forms might be adopted without departing from the spirit and scope of the invention.

What I claim is as follows:

1. A hydrometer for electrolytic cells and the like, comprising in combination, a movable hydrometer and scale member completely submerged within the electrolyte of the cell, and means for supporting the hydrometer and scale member, said means constituting an indicating element adapted to cooperate with the scale member upon movement thereof to indicate the condition of charge of the cell.

2. A hydrometer for electrolytic cells and the like, comprising, in combination, a movable hydrometer and scale member submerged within the electrolyte of the cell, and a support for the hydrometer and scale member, the support carrying indicating means adapted to cooperate with the scale member to indicate the state of charge of the cell.

3. A hydrometer for electrolytic cells and the like, comprising in combination, an electrolytic cell, with a supporting device secured thereto and located at a level of the electrolyte least affected by stratification, and a hydrometer and scale member completely submerged within the electrolyte of the cell and mounted for movement on said support.

4. A hydrometer member adapted to be pivotally supported and comprising a counter-weight portion so arranged that the center of gravity of the hydrometer member is directly beneath its support at substantially the midposition of the range of movement of the hydrometer member, and a displacement member secured thereto substantially on a horizontal line with the support.

5. A pivotally supported hydrometer member having a specific gravity in excess of the maximum to be tested and having its center of gravity directly beneath its support when immersed in a fluid of specific gravity substantially midway between the maximum and minimum to be tested, and a displacement member secured thereto substantially on a horizontal line with the support.

6. A hydrometer for electrolytic cells and the like, comprising in combination, a scale member of specific gravity greater than the maximum specific gravity of the electrolyte and adapted to be supported submerged within the electrolyte, with a displacement member mounted on the scale member and having a specific gravity intermediate between the substantial maximum and minimum of the specific gravity of the electrolyte.

7. A hydrometer for electrolytic cells and the like, comprising a scale member of celluloid which is heavier than the maximum specific gravity of the electrolyte, with a displacement member of rubber carried upon said scale member and whose specific gravity is intermediate between the maximum and the minimum specific gravity of the electrolyte.

8. A hydrometer for electrolytic cells and the like, comprising a flat fan shaped member carrying a scale, and with a displacement member mounted at one side thereof having a specific gravity differing from that of the fan shaped member.

9. A hydrometer for electrolytic cells and the like, comprising in combination, an electrolytic cell, a support positioned in said cell and providing a knife edge bearing; a flat fan shaped scale member formed with a scale and having a corresponding knife edge bearing for contact with said support; a displacement member mounted at one side of the scale member; and a counter-weight portion projecting from the scale member to counter-balance the displacement member, with the center of gravity of the combined scale and displacement members located below the center of support.

10. The method of pre-treating the celluloid of a hydrometer member for electrolytic cells which consists in first chemically cleaning the surface of the celluloid by washing the same with a solution containing sodium cyanide and then subjecting the celluloid for a short time to the gassing electrolyte.

11. A hydrometer for electrolytic cells and the like, comprising in combination, an electrolytic cell, with a unitary hydrometer and scale member submerged within the electrolyte of the cell and movable therein to indicate the condition of charge of the cell, said hydrometer including a displacement member whose coefficient of expansion is such as to compensate for variations in the temperature of the electrolyte.

12. A hydrometer for electrolytic cells and the like, comprising in combination, an electrolytic cell, with a unitary hydrometer and scale member completely submerged within the electrolyte of the cell and movable therein to indicate the condition of charge of the cell, said hydrometer including a displacement member of rubber which has been cured in such a manner that its coefficient of expansion will compensate for variations in temperature of the electrolyte.

13. The method of pre-treating the celluloid of a hydrometer member for electrolytic cells which consists in first chemically cleaning the surface of the celluloid by washing the same with a solution containing sodium cyanide and pumice stone and then subjecting the celluloid for a short time to the gassing electrolyte.

14. A material for hydrometers, consisting of celluloid washed in sodium cyanide.

15. A hydrometer member adapted to be pivotally supported and comprising a counter-weight portion so arranged that the center of gravity of the hydrometer member is directly beneath its support at substantially the mid-position of the range of movement of the hydrometer member, and a displacement member secured thereto to one side of said support.

In testimony whereof I affix my signature in the presence of two subscribing witnesses.

THOMAS MIDGLEY, JR.

Witnesses:
WALTER W. RIEDEL,
J. W. MCDONALD.